United States Patent [19]
Leorat et al.

[11] Patent Number: 5,448,029
[45] Date of Patent: Sep. 5, 1995

[54] IDLING ENGINE CLUTCH RELEASE CONTROL DEVICE OF AN AUTOMATIC TRANSMISSION

[75] Inventors: Francois Leorat, Versailles; Jacques Lauter, Maurepas, both of France

[73] Assignee: Regie Nationale des Usines Renault, Boulogne-Billancourt, France

[21] Appl. No.: 155,627

[22] Filed: Nov. 22, 1993

[51] Int. Cl.⁶ ............................................. H01H 3/16
[52] U.S. Cl. .............................. 200/61.89; 200/61.91
[58] Field of Search ......................... 200/61.88–61.91

[56] References Cited

U.S. PATENT DOCUMENTS

| | | | |
|---|---|---|---|
| 3,626,919 | 12/1971 | MacMillan | 123/198 DB |
| 3,722,492 | 3/1973 | Shibata | 200/61.9 |
| 3,904,007 | 9/1975 | Braun et al. | 192/0.076 |
| 4,046,032 | 9/1977 | Baun | 477/122 |
| 4,093,050 | 6/1978 | Mizuno | 192/0.049 |
| 4,736,077 | 4/1988 | Valente | 200/84 C |
| 4,795,864 | 1/1989 | Leorat | 200/61.91 |
| 4,894,652 | 1/1990 | Eckstein et al. | 200/61.89 |
| 4,924,207 | 5/1990 | Lariscy | 200/61.89 |
| 5,013,930 | 5/1991 | Spakowski et al. | 200/61.89 |

FOREIGN PATENT DOCUMENTS 0251866 1/1988 European Pat. Off. .

*Primary Examiner*—J. R. Scott
*Attorney, Agent, or Firm*—Oblon, Spivak, McClelland, Maier & Neustadt

[57] ABSTRACT

An idling engine clutch release control device of an automatic transmission, which includes an electric switch connected to the accelerator pedal and to an element for metering the fuel, wherein closing of the switch prevents release of the stationary clutch. The switch is controlled by two opposed springs, which close the switch when the pressing force of the driver on the accelerator pedal is significant.

5 Claims, 1 Drawing Sheet

IDLING ENGINE CLUTCH RELEASE CONTROL DEVICE OF AN AUTOMATIC TRANSMISSION

BACKGROUND OF THE INVENTION

1. Field of the Invention

This invention relates to the electric control of the feed pressure of a hydraulic receiver, particularly for the input clutch on the first gear of a motor vehicle automatic transmission.

2. Discussion of the Background

For control of this type of clutch, so-called electronic control engine idling clutch release systems are known, such as the one described in the French Patent publication FR 2600597 of applicant, which make it possible to eliminate, on a vehicle equipped with an automatic transmission, the spontaneous tendency to "creep" from a stop, when handling considerations make this tendency undesirable.

The main difficulty encountered in the development of such systems appears during restarting, when the driver again presses on the accelerator and opens, in an essentially variable way, the throttle valve for a gasoline engine or the device for metering the Diesel fuel for a Diesel engine. Actually, it is very difficult to find settings that give a satisfactory result from the point of view of starting comfort, both for a start with a thin stream of gas, and for a "foot to the floor" (i.e. accelerator pedal completely depressed) start. The shortcomings are reflected by a jerking motion upon acceleration, which is unacceptable considering the standards of comfort required of modern automatic transmissions.

These shortcomings are explained by the fact that the engine idling clutch release systems known to date are activated by the simultaneous monitoring of preestablished conditions, particularly the speed of the vehicle, the speed of the engine, the output speed of the converter and the angular position $\alpha c$ of the fuel metering element of the engine, in relation to its idling position particular, for the latter, the condition most often imposed is: $\alpha c - /\alpha c$ at idle.

Actually, the angular $\alpha c$ does not take into account:
- the advantage which exists in being able to perform maneuvers at idle, precisely by using the "creeping" phenomenon characteristic of automatic transmissions. Actually, to cause engine idling clutch release to cease, it in necessary that $\alpha c > \alpha c$ at idle, which results from pressing on the accelerator in a perceptible way;
- the inevitable response time for filling of the input clutch cylinder which, although held in a mating position, is not able to transmit without a certain delay, albeit a minimum delay, the full engine torque during fully depressed accelerator pedal start. By nature, the measurement of $\alpha c$ does not allow any anticipation of the arrival of the torque. Anticipation would make it possible to eliminate the response time of the input clutch.

It is known how to eliminate said drawbacks of the known "engine idling clutch release" systems (i.e. clutch release while the engine is idling), by substituting for the measurement of angular position $\alpha c$, a so-called "foot pressed" switch, inserted on the accelerator control. The switches known to date to fulfill this function, such as the one described in the previously mentioned French patent publication FR 2600597 of the applicant, exhibit a complex mechanical structure, which makes it possible for them, of course, to meet the multiple functional requirements including fluidtightness, protection of contacts, minimal friction, etc.—but at the expense of sometimes insufficient reliability and high cost.

SUMMARY OF THE INVENTION

This invention relates to a switch that meets all the functional requirements imposed for its insertion into an engine idling clutch release device, while demonstrating very great reliability and having the advantage of a particularly favorable cost.

It relates to an idling clutch release control device of an automatic transmission, comprising an electric switch connected, on the one hand, to the accelerator pedal, and on the other hand, to an element for metering the fuel. This device is characterized in that the closing of the switch allows for inhibition of the idling clutch release function, and in that it is controlled by two opposing springs, adjusted so as to close the switch when the pressing force of the user on the accelerator pedal is significant.

According to an embodiment of the invention, the switch comprises a cylindrical body connected to the accelerator pedal, and elastically holding the end of the carburetor control cable. The end of the cable is held by an annular magnet that can slide inside the cylindrical body, so as to be applied against a first end of the cylindrical body, by the first spring as long as the tractive force on the cable remains less than its dead weight, and so as to move away from this end when the tractive force exceeds this dead weight.

Also, according to an embodiment of the invention, the contact elements of the switch are the contacts of a reed switch, located outside of the cylindrical body, so that the displacement of the magnet away from the first end of the cylindrical body assures closing of the contact elements. The first spring in placed between the magnet and an element simultaneously assuring plugging of the cylindrical body at its second end, and the centering of the carburetor control cable.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
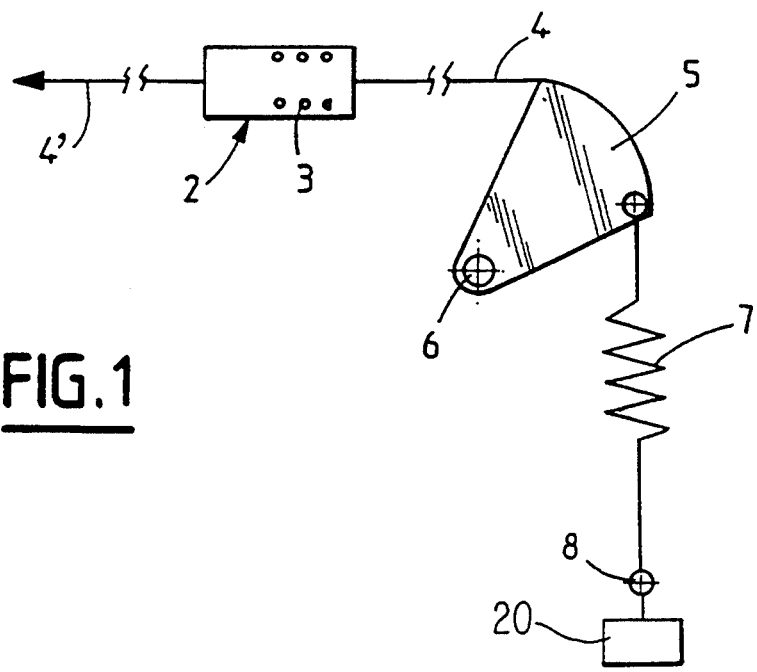
FIG. 1 represents diagrammatically the insertion of a switch according to the invention, in the control of the throttle valve or of the injection pump lever by the accelerator pedal of a vehicle.

In FIG. 1, a cylindrical body 2 of an electric switch 1, and a first spring 3, placed inside the body, have been represented diagrammatically. Switch 1 is connected by carburetor control cable 4 to a cam 5, for providing control of the carburetor 20. Cam 5 pivots around a first stationary point 6 of the engine, and it is connected by a second spring 7 to the metering element 8 of the carburetor 20 or of the injection pump. Furthermore, switch 1 is connected by a connecting member 4.

Figure 2:
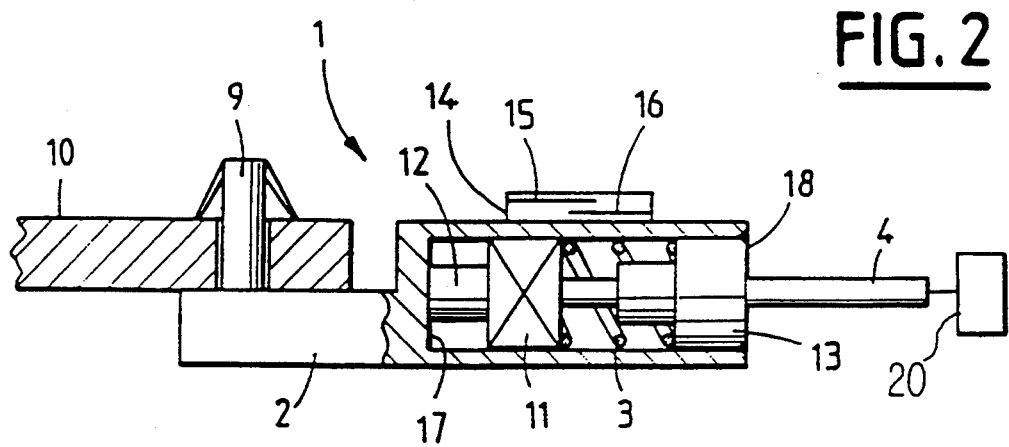
FIG. 2 represents the switch in a rest position.
Figure 3:
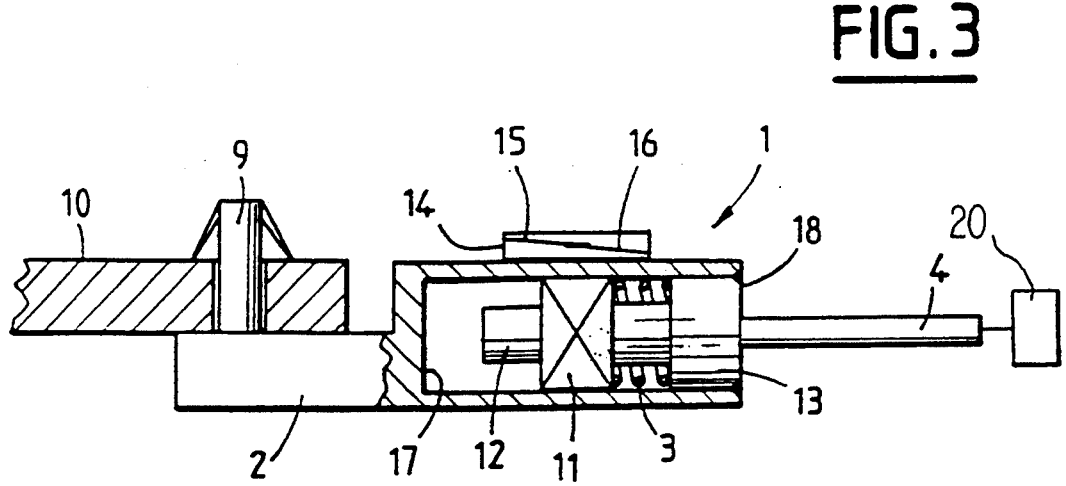
FIG. 3 represents the switch in an activated position.

Referring to FIGS. 2 and 3, switch 1, the cylindrical body 2, and the first spring 3 are illustrated. Switch 1 here is connected in a standard manner by a pivot pin 9, on the end of an accelerator pedal 10, so that cylindrical body 2 is continually in line with carburetor control cable 4 which connects to the carburetor 20. Cable 4 is engaged with the cam 5 (not shown in FIG. 2) subjected to the opposing biasing of second spring 7, as shown in FIG. 1. Inside of cylindrical body 2, the cable 4 passes through a magnet 11 that is slidable inside cylindrical body 2. The end of cable 4 is held by the magnet 11. This arrangement makes it possible for the cable 4 to shift the magnet 11 in response to significant pressing by the user on accelerator pedal 10. First spring 3 is located on the other side of magnet 11. It rests on the latter and on a centering pin 13, that also acts as a plug for the cylindrical body 2.

A reed switch 14, for example, a reed switch, is fastened to the outside of cylinder body 2 of switch 1, so that, when the end 12 of the cable 4 is resting against a first end 17 of cylindrical body 2 (i.e. when the tractive force of accelerator pedal 10 on cable 4 is less than the dead weight of the first spring 3), the magnet 11 is spaced from contacts 15, 16 of switch 14, which therefore remain in an open position (FIG. 2). Switch 1 is then at rest in an open position as shown in FIG. 2. The idling clutch release function (i.e., declutching while the engine is idling stopped or at rest) of the transmission can be activated by the switch being in this position. On the other hand, when the pulling force on cable 4 exceeds the dead weight of spring 3, because of the action on pedal 10 that is significant, yet insufficient to cause the cam 5 to pivot against the pull exerted on it by second spring 7, the magnet 11 is positioned adjacent contacts 15, 16 of switch 14. The latter are then brought together. Switch 1 is closed (FIG. 3), and the idling clutch release function is inhibited. The user can then take advantage of the "creeping" effect of the automatic transmission, particularly to perform parking maneuvers.

Of course, the relative adjustment of springs 3, 7, opposed in their action on magnet 11, must be established so as to allow the passage of switch 1 in the closed position, before the intake throttle valve or the lever of the injection pump, controlled by cam 5, have shifted from their rest position, which makes it possible for the control device of the invention to differentiate, in an engine idling situation, the states of a "pressed foot" or "nonpressed foot" on the accelerator. As can thus be understood, the present invention overcomes the drawbacks of known stationary clutch release switches, while offering superior performance, particularly in terms of undesirable friction. The invention is particularly simple to use, since it necessitates only a very small number of constituent parts and the reliability of the idling engine clutch release control is thus considerably increased. Finally, it must be stressed that the cost of this switch is very low, even though undesirable friction is kept at a particularly low level.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An idling engine clutch release control device of an automatic transmission of an automobile having an accelerator pedal, comprising:
   a switch connected to an accelerator pedal of an automobile and to a fuel metering element, wherein closing of the switch permits operation of an engine idling clutch, and
   at least one replacement spring connected to said switch and controlling said switch wherein said at least one spring closes the switch when a pressing force of a driver on the accelerator pedal is of a predetermined value, while keeping said switch open when the pressing force is less than the predetermined value.

2. A control device according to claim 1, which comprises a carburetor control cable wherein the switch 1 comprises a cylindrical body connected to the accelerator pedal and wherein said cylinder body elastically holds therein an end portion of the carburetor control cable.

3. A control device according to claim 2, wherein the switch comprises an annular magnet slidably positioned in said cylinder body and
   said at least one spring mechanism includes a spring located in said cylinder body, wherein the end of the accelerator cable is connected to said annular magnet so as to be biased against a first end of the cylindrical body by the spring when the pressing force of the driver on the accelerator pedal is less than a predetermined value and is movable away from said first end when the force on the accelerator exceeds said predetermined value.

4. Control device according to claim 2 wherein the switch comprises contacts located outside of the cylindrical body, such that displacement of the magnet away from the first end of the cylindrical body causes closing of the contacts.

5. Control device according to claim 3, wherein the spring mechanism presses against the magnet and wherein a centering element is located in the cylinder and simultaneously plugs the cylindrical body at a second end of the cylinder body and centers the carburetor control cable in the cylinder body.

* * * * *

UNITED STATES PATENT AND TRADEMARK OFFICE
CERTIFICATE OF CORRECTION

PATENT NO. : 5,448,029
DATED : September 5, 1995
INVENTOR(S) : Francois LEORAT, et al.

It is certified that error appears in the above-indentified patent and that said Letters Patent is hereby corrected as shown below:

On the title page, the Foreign Application Priority Data has been omitted. It should read:

--Nov. 20, 1992 [FR]  France.........92-13944--

Signed and Sealed this

Fourteenth Day of November, 1995

*Attest:*

BRUCE LEHMAN

*Attesting Officer*      *Commissioner of Patents and Trademarks*